United States Patent

[11] 3,621,937

| [72] | Inventors | Robert G. Edge<br>Derby;<br>Arthur G. Goss, near Derby, both of<br>England |
|---|---|---|
| [21] | Appl. No. | 866,479 |
| [22] | Filed | Oct. 15, 1969 |
| [45] | Patented | Nov. 23, 1971 |
| [73] | Assignee | Rolls-Royce Limited<br>Derby, Derbyshire, England |
| [32] | Priority | Oct. 24, 1968 |
| [33] | | Great Britain |
| [31] | | 50,567/68 |

[54] LUBRICATION SYSTEM
9 Claims, 1 Drawing Fig.

[52] U.S. Cl. .................................................. 184/6.11,
                                                               60/39.08
[51] Int. Cl. .................................................. F02c 7/06
[50] Field of Search ............................................. 184/6 TS, 6;
                                         60/39.08; 308/187, 126, 127

[56] References Cited
UNITED STATES PATENTS

| 2,866,522 | 12/1958 | Morley et al. | 184/6 |
| 2,870,870 | 1/1959 | Haworth et al. | 184/6 |
| 2,871,982 | 2/1959 | Buell | 184/6 |
| 2,874,803 | 2/1959 | Gunberg | 184/6 |
| 2,999,000 | 9/1961 | Spat | 184/6 X |
| 3,266,596 | 8/1966 | Blackhurst et al. | 60/39.08 X |

Primary Examiner—Manuel A. Antonakas
Attorney—Cushman, Darby & Cushman

ABSTRACT: To lubricate the splined connection between a pair of coaxial horizontal shafts, one shaft is hollow and has a lubricant supply conduit therein. One end of this shaft is closed by a cap. Lubricant passes through radial apertures in the shaft and in the cap. A lubricant trap is formed on the shaft. When the speed of rotation of the shaft exceeds a predetermined value, the centrifugal force retains some lubricant in the trap, and below that speed, lubricant spills from the trap to the splines, the cap preventing it from spilling into the hollow shaft.

PATENTED NOV 23 1971
3,621,937
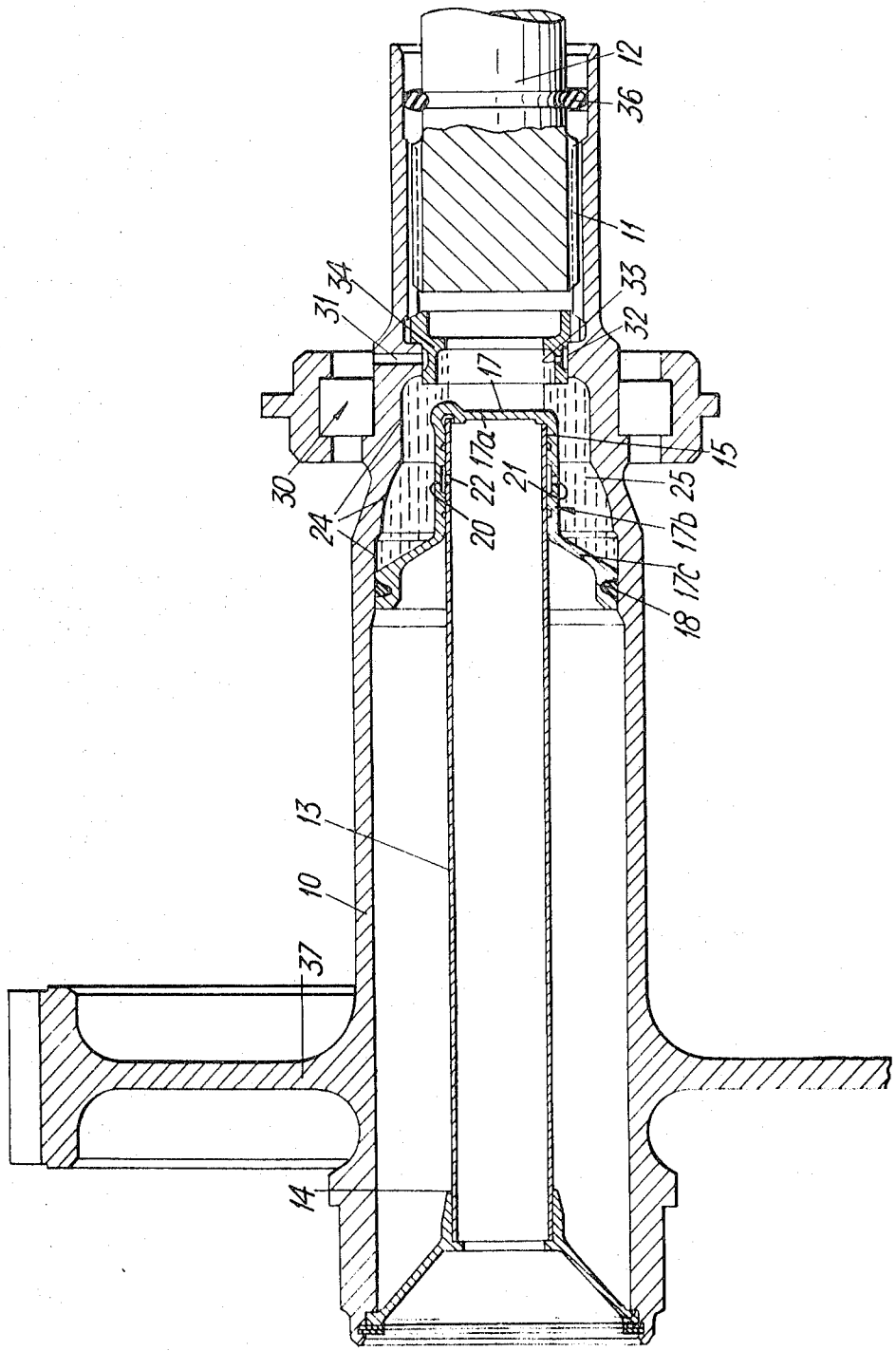
INVENTORS
Robert K. Edge
Arthur D. Dow
BY
Cushman, Darby & Cushman
ATTORNEYS

LUBRICATION SYSTEM

This invention relates to a lubrication system and is an improvement of copending application Ser. No. 805,147 and assigned to the same assignee. Although it is not so restricted, this invention will be particularly described with reference to lubricating the splines of a splined shaft connection.

According to the present invention in its broadest aspect, there is provided a lubrication system including a hollow shaft which is adapted to be substantially horizontal in operation, a lubricating conduit mounted within and spaced from said shaft, means for supplying the interior of said conduit with lubricant, a closure member extending across the interior of the said shaft to close the end of said conduit, an annular reservoir located between said conduit and said shaft, the conduit and the closure member having apertures therein for the passage of lubricant to the reservoir, a substantially radially inwardly extending member defining one sidewall of the reservoir, a radially inwardly directed annular lip spaced axially from the said one sidewall of the reservoir and defining the other substantially radially extending sidewall of the reservoir, a part to be lubricated located axially of said lip and disposed externally of said reservoir, the radial extent of said lip being such that, when the speed of rotation of the shaft falls below a predetermined value, lubricant will spill from the reservoir over the lip to lubricate said part.

In accordance with a preferred embodiment of the present invention, said shaft is a first shaft which is splined to a second rotary shaft, the splines constituting the said part.

Preferably an annular sealing member is provided between the internal surface of said first shaft and the external surface of said second shaft, the said sealing member being located on the side of the splines remote from the said reservoir.

Preferably, the said first shaft is mounted in a bearing and is provided with at least one radial aperture adjacent said bearing, said aperture communicating with said reservoir.

Said one sidewall of the reservoir may be constituted by a substantially radially extending flange on the closure members and the first shaft may be formed with a stepped inwardly converging internal cross section to constitute at least part of said other sidewall of said reservoir, the said closure member having a radial flange constituting another sidewall thereof.

The said conduit may be secured coaxially within the first shaft for rotation therewith.

Preferably, said closure member is sealed to said first shaft.

In a preferred arrangement, a first passage communicated between the interior of the said conduit and an annular chamber defined between the said closure member and the external surface of said conduit, there being a second passage which communicates between the said chamber and the said reservoir, the said passages being angularly spaced apart by substantially 180°.

The first shaft or at least one of said shafts may be a drive shaft for driving an accessory of a gas turbine engine.

The invention also includes a gas turbine engine provided with a lubrication system as set forth above.

The invention will be described, merely by way of example, with reference to the accompanying drawing, which is a sectional view of one preferred embodiment of a lubrication system in accordance with the present invention.

Referring to the drawing, there is shown a first, hollow rotatable shaft 10 which is connected by splines 11 to a second rotary shaft 12. The shafts 10 and 12 are adapted to be used in operation with their respective axes substantially horizontal.

Mounted coaxially within the first shaft 10 is a lubricant supply conduit or oil feed tube 13 which is adapted to be supplied with lubricant at one end 14 thereof. This end 14 of tube 13 is rigidly secured to the shaft 10 for rotation therewith, e.g. by struts brazed thereto. The other end 15 of the tube 13 is closed by a closure member or cap 17. The cap extends completely across the interior of the shaft 10 and is sealed thereto by seals 18.

As can be seen, the cap 17 comprises a substantially radial portion 17a which engages and closes off the end 15 of the tube 13, a substantially cylindrical portion 17b which engages and surrounds the external periphery of the tube 13 and finally a frustoconical portion 17c for engaging the interior of the shaft 10 via the seals 18.

The substantially axial portion 17b of the cap 17 is provided with an annular groove or chamber 20 and with a radial passageway 21. The annular groove 20 is aligned with a substantially radial passageway 22 in the oil feed tube 13, the passageways 21, 22 being spaced apart by 180°. Thus in operation, when the shafts 10 and 12 rotate, the oil feed tube 13 also rotates, and any oil supplied to the interior of the tube 13 will be centrifuged axially therealong and will pass out from the tube through the passageway 22, annular groove 20 and passageway 21 to the outside of the cap 17.

Substantially radially opposite the axial portion 17b of the cap 17 the shaft 10 is provided with a series of steps 24 shaped so as to progressively decrease the internal diameter of the shaft 10, As will be clear from the description below, the frustoconical portion 17c of the cap 17 and the steps 24 of the shaft 10 form between them an oil reservoir 25.

It will also be observed that the narrowest portion of the shaft 10 is axially adjacent the splines 11 which connect the shafts 10 and 12.

The shaft 10 is journaled in a bearing 30 which, of course, in operation needs lubrication. For this purpose, the shaft 10 is provided adjacent the bearing 30 with at least one (in practice, several) radial drilling 31. The radially inner ends of the drillings 31 communicate with an annular groove 32, the radially inner portion of which in turn communicate with one or more radial drillings 33 in an annular member 34 secured to shaft 10.

Downstream of the splines 12 a rubber sealing ring 36 is provided between the outer surface of the shaft 12 and the inner surface of the shaft 10.

The shaft 10 is provided with an integral radially extending web 37 the outer end of which may be provided with gear teeth so as to enable the shaft 10 to drive a gear train (not shown). Thus the shaft 10 may be a drive shaft for accessories of a gas turbine engine. Additionally, or alternatively, the shaft 12 may be a drive shaft for accessories of a gas turbine engine.

The foregoing description has explained how oil passing into the end 14 of the tube 13 reaches the reservoir 25. It will further be appreciated that the centrifugal effect will in operation cause the oil to advance axially along the interior surface of the shaft 10, i.e. along the stepped portions 24, and to pass through drilling 33 in ring 34, annular groove 32 to the drillings 31 and thence to the bearing 30 to lubricate the latter.

When rotation of the shafts 10, 12 ceases, the oil is prevented from draining back into the oil feed tube 13 by the cap 17 and by the 180° separation of the passageways 21, 22 and in the absence of any centrifugal forces, the oil will drain into the reservoir 25, and from there some oil in excess of the capacity of the reservoir 25 will pass over the edge or lip of ring 34 into some of the splines 11.

When rotation of the shafts 10, 12 is restarted, it will be appreciated that oil will be centrifuged from the reservoir 25 and from said some of the splines 11 to fill all the spaces between the splines 11 thereby preventing the splines from rotating in a dry condition.

Although the above description has been given with the object of lubricating the splines 11, it will be appreciated that some other member or part may be lubricated using the principle of the present invention.

We claim:

1. A lubrication system comprising a hollow shaft which, in operation, is substantially horizontal, a lubricant conduit mounted within and spaced from said shaft, means for supplying the interior of said conduit with lubricant, a closure member extending across the interior of said shaft to close the end of said conduit, an annular reservoir located between said conduit and said shaft, said conduit and said closure member having apertures therein for passage of lubricant to said reservoir, a substantially radially inwardly extending member defining one sidewall of the reservoir, a radially inwardly directed annular lip spaced axially from the said one sidewall of the reservoir and defining another substantially radially extending sidewall of the reservoir, a part to be lubricated located axially of said lip and disposed externally of said reservoir, the radial extent of said lip being such that, when the speed of rotation of said shaft falls below a predetermined value, lubricant will spill from said reservoir over said lip to lubricate said part.

2. A lubrication system as claimed in claim 10, wherein said shaft is a splined first shaft, there being a second shaft which is also splined, the said splines interconnecting the said shafts and constituting the said part.

3. A lubrication system as claimed in claim 2 wherein an annular sealng member is provided between the internal surface of said first shaft and the external surface of said second shaft, the said sealing member being located on the side of the splines remote from the said reservoir.

4. A lubrication system as claimed in claim 10 wherein there is a bearing wherein the first shaft is mounted, said first shaft having at least one radical aperture defined therein adjacent said bearing, said aperture communicating with said reservoir.

5. A lubrication system as claimed in claim 10 wherein said one sidewall of the reservoir is constituted by a substantially radially extending flange on said closure member, and the first shaft is formed with an inwardly converging internal cross section to constitute at least part of said other sidewall of said reservoir.

6. A lubrication system as claimed in claim 10 wherein said conduit is secured coaxially within the first shaft for rotation therewith.

7. A lubrication system as claimed in claim 10 wherein said closure member is sealed to said first shaft.

8. A lubrication system as claimed in claim 10 wherein a first passage communicates between the interior of the said conduit and an annular chamber defined between the said closure member and the external surface of said conduit, there being a second passage which communicates between the said chamber and the said reservoir, the said passages being angularly spaced apart by substantially 180°.

9. A lubrication system as claimed in claim 10, wherein the first shaft is a drive shaft for driving an accessory of a gas turbine engine.

* * * * *